United States Patent
Hur et al.

(10) Patent No.: US 10,833,723 B2
(45) Date of Patent: Nov. 10, 2020

(54) DOWNLINK RECEIVER CHANNEL ISOLATION

(71) Applicant: Apple Inc., Cupertino, CA (US)

(72) Inventors: Joonhoi Hur, Sunnyvale, CA (US);
Rastislav Vazny, Sunnyvale, CA (US);
Ronald William Dimpflmaier, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/356,855

(22) Filed: Mar. 18, 2019

(65) Prior Publication Data
US 2020/0304168 A1 Sep. 24, 2020

(51) Int. Cl.
*H04B 1/00* (2006.01)
*H04B 17/00* (2015.01)
(Continued)

(52) U.S. Cl.
CPC .......... *H04B 1/525* (2013.01); *H04B 1/0475* (2013.01); *H04B 1/7107* (2013.01); *H04L 5/001* (2013.01); *H04L 5/1461* (2013.01)

(58) Field of Classification Search
CPC ...... H01B 1/525; H01B 1/1027; H01B 1/123; H01B 1/10; H01B 1/109; H01B 1/0475;
(Continued)

(56) References Cited

U.S. PATENT DOCUMENTS

| 9,000,860 B2 * | 4/2015 | Mikhemar | H04B 1/525 333/12 |
| 9,143,307 B2 * | 9/2015 | Mikhemar | H04B 1/525 |
| | | (Continued) | |

FOREIGN PATENT DOCUMENTS

WO 2019005145 A1 1/2019

OTHER PUBLICATIONS

Hershberg, et al.; "A Dual-Frequency 0.7-to-1GHz Balance Network for Electrical Balance Duplexers"; 2016 IEEE International Solid-State Circuits Conference; ISSCC 2016 / Session 20 / RF-to-THz Transceiver Techniques / 20.8; pp. 356-358.

(Continued)

*Primary Examiner* — Quochien B Vuong
(74) *Attorney, Agent, or Firm* — Fletcher Yoder PC (57) ABSTRACT

The representative embodiments discussed in the present disclosure relate to techniques in which isolation between transmission signals and received signals in a transceiver may be maintained during downlink carrier aggregation. More specifically, in some embodiments, the transceiver may be implemented to include an electrical balance duplexer that isolates a signal component of a signal transmitted via the transceiver from a receiver signal path of the transceiver. The transceiver may also include analog interference cancellation circuitry implemented to isolate a noise component of the signal transmitted via the transceiver from the receiver signal path (e.g., from one or more downlink receiver channels). As such, the transceiver may operate using inter-band, non-contiguous downlink carrier aggregation, intra-band, non-contiguous downlink carrier aggregation, intra-band, contiguous carrier aggregation, and/or the like.

19 Claims, 8 Drawing Sheets

(51) Int. Cl.
    *H04B 1/525*     (2015.01)
    *H04B 1/04*     (2006.01)
    *H04L 5/00*     (2006.01)
    *H04B 1/7107*     (2011.01)
    *H04L 5/14*     (2006.01)

(58) Field of Classification Search
    CPC ........ H01B 1/12; H01B 1/40; H01B 7/15585;
        H01B 10/2507; H01B 15/00; H04W
        72/042; H04W 88/02; H04L 5/14; H04L
        5/1461
See application file for complete search history.

(56) References Cited

U.S. PATENT DOCUMENTS

| | | | | |
|---|---|---|---|---|
| 9,584,294 | B2* | 2/2017 | Ko | H04B 1/1027 |
| 9,712,258 | B2* | 7/2017 | Mikhemar | H04B 1/525 |
| 9,973,233 | B2* | 5/2018 | Liu | H04B 1/525 |
| 10,284,356 | B2* | 5/2019 | Bharadia | H04L 5/1461 |
| 10,432,324 | B2* | 10/2019 | Kim | H04L 5/14 |
| 2016/0294425 | A1* | 10/2016 | Hwang | H04B 1/525 |
| 2017/0041095 | A1* | 2/2017 | Hwang | H04B 1/0475 |
| 2018/0375566 | A1 | 12/2018 | Hong et al. | |

OTHER PUBLICATIONS

Zhou, Jin; "Integrated Self-Interference Cancellation for Full-Duplex and Frequency-Division Duplexing Wireless Communication Systems"; White paper for Columbia University dated 2017; pp. 233.

\* cited by examiner

DOWNLINK RECEIVER CHANNEL ISOLATION

BACKGROUND

The present disclosure relates generally to techniques for facilitating radio frequency (RF) communications and, more particularly, to transceivers with analog interference cancellation circuitry.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transceivers are found in a variety of electronic devices. Phones, computers, internet connectivity routers, radios, televisions, and many other stationary or handheld devices use transceivers to send and receive data. Certain types of transceivers, known as wireless transceivers, may generate wireless signals to be transmitted by way of an antenna in the transceiver. Moreover, certain transceivers may facilitate full-duplex communication, which is communication where incoming signals can be received while outgoing signals are being sent, allowing for high speed data transmission. A full-duplex transceiver may concurrently transmit and receive radio-frequency (RF) data signals via an antenna coupled to the transceiver. In full-duplex communication, however, the transmission signal could produce distortion or noise on the received signal, and the received signal could produce distortion or noise on the transmission signal.

Accordingly, the transceiver may isolate a signal transmitted via the antenna (e.g., a transmission signal) from a signal concurrently received via the antenna (e.g., a received signal) and vice versa to remove distortion or noise introduced by the received signal in the transmission signal and to remove distortion or noise introduced by the transmission signal on the received signal. Isolating the transmission signal from the received signal may involve using a duplexer, such as a power amplifier duplexer, to filter the transmission signal from the received signal, but these techniques may be unsatisfactory for carrier aggregation (CA), which involves using multiple carrier signals per channel. Thus, while carrier aggregation may allow an increased bandwidth compared to non-carrier aggregation use cases, the noise on the received signal due to the transmission signal could cause the received signal to include an unsatisfactory amount of noise.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To facilitate communication techniques using carrier aggregation (CA), which may involve the use of a wider frequency range during signal transmission and/or reception, the number of duplexers and/or switches included in the transceiver may be increased. The additional duplexers and/or switches may provide isolation between the receiver and transmission signal paths across the wider frequency range. However, the additional duplexers and/or switches may be costly to implement in terms of power consumption, area consumption, time, resources, and/or the like. Accordingly, instead of or in addition to using a power amplifier duplexer, an electrical balance duplexer (EBD) may be used to provide isolation between the transmission and receiver signal paths based on an electrical balance (e.g., impedance). More specifically, the electrical balance duplexer may be used to reduce the effect of a signal component of the transmission signal on the downlink carrier aggregation signals received at the receiver of the transceiver. However, because the electrical balance duplexer may be implemented to isolate a particular bandwidth, a noise component in the transmission signal, which may include as harmonics of the signal component, inter-modulation products, and/or the like, may still be present in the received downlink carrier aggregation signals. That is, for example, the noise in the transmission signal may de-sense the received downlink carrier aggregation signals as interference.

Accordingly, in addition to the electrical balance duplexer, the transceiver may be implemented to include analog interference cancellation circuitry and/or logic, which may be implemented to isolate the noise component of the transmission signal from the downlink channels in the receiver signal path of the transceiver (e.g., downlink receiver channels). The analog interference cancellation circuitry may be implemented to receive (e.g., sample) the transmission signal output from a power amplifier (PA) of the transceiver and to route the transmission signal to a divider (e.g., one or more buffers), which may distribute the transmission signal to multiple analog interference cancellation (AIC) units. For example, in some embodiments, the AIC circuitry and/or logic may include a respective signal AIC tap for each downlink receiver channel (e.g., for each component carrier in the received downlink carrier aggregated signal). An AIC unit may be implemented to include a respective variable delay circuit and a respective variable gain circuit. Further, in some embodiments, the AIC circuitry and/or logic may include a multiplexer to realize multi-tap operations. Additionally or alternatively, to reduce the circuitry and/or area included in the AIC circuitry and/or logic, the AIC circuitry and/or logic may be implemented to reuse AIC taps across multiple different downlink receiver channels.

The analog interference cancellation circuitry may additionally be communicatively coupled to a controller (e.g., control logic), which may be implemented in the radio-frequency front end (RFFE) of the transceiver. The RFFE and/or the analog interference cancellation circuitry may characterize the noise component in the transmission signal and may adjust the respective delay and the respective gain applied by the AIC units to isolate the noise component from each downlink receiver channel. To that end, the outputs of the AIC circuitry and/or logic may be subtracted from and/or the inverse of the outputs may be added to the downlink receiver channels to reduce and/or remove the effect of the noise component of the transmission signal in the receiver signal path.

Accordingly, the representative embodiments discussed in the present disclosure relate to techniques in which isolation between transmission signals and received signals in a transceiver may be maintained during downlink carrier aggregation. More specifically, in some embodiments, an electrical balance duplexer and analog interference cancellation circuitry may be implemented to isolate a signal component and a noise component of a transmission signal, respectively, from a receiver signal path of the transceiver (e.g., from one or more downlink receiver channels). As such, the transceiver may operate using inter-band, non-contiguous downlink carrier aggregation, intra-band, non-contiguous downlink carrier aggregation, intra-band, contiguous carrier aggregation, and/or the like.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
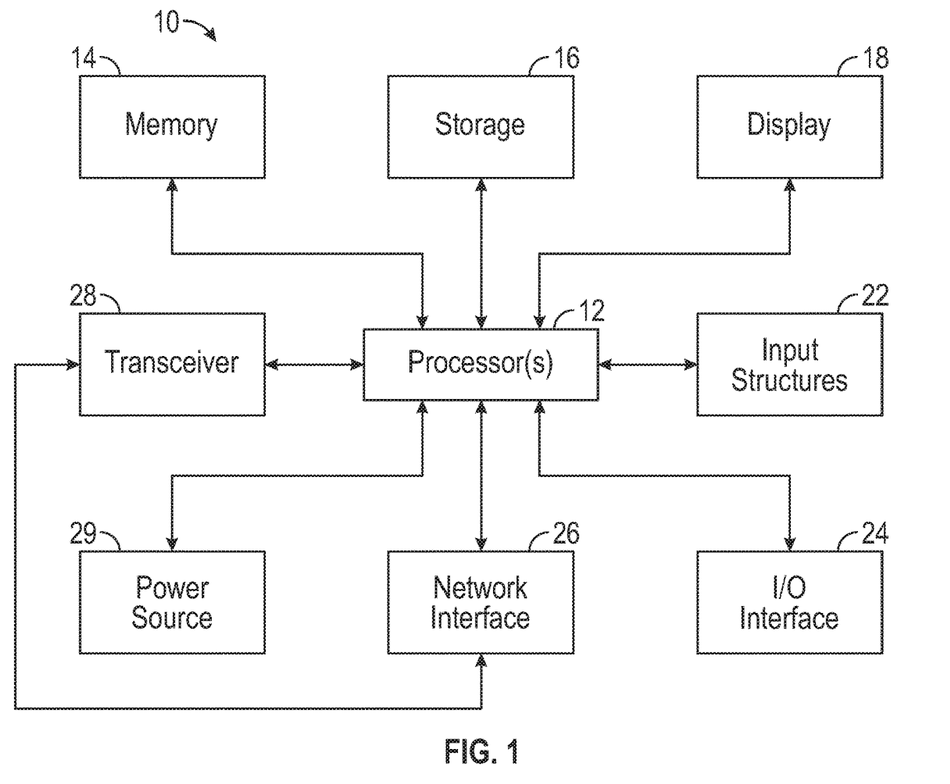
FIG. 1 is a schematic block diagram of an electronic device including a transceiver, in accordance with an embodiment.

With the foregoing in mind, a general description of suitable electronic devices that may employ a transceiver that includes analog interference cancellation circuitry and/or an electrical balance duplexer will be provided below. Turning first to FIG. 1, an electronic device 10 according to an embodiment of the present disclosure may include, among other things, one or more processor(s) 12, memory 14, nonvolatile storage 16, a display 18, input structures 22, an input/output (I/O) interface 24, a network interface 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
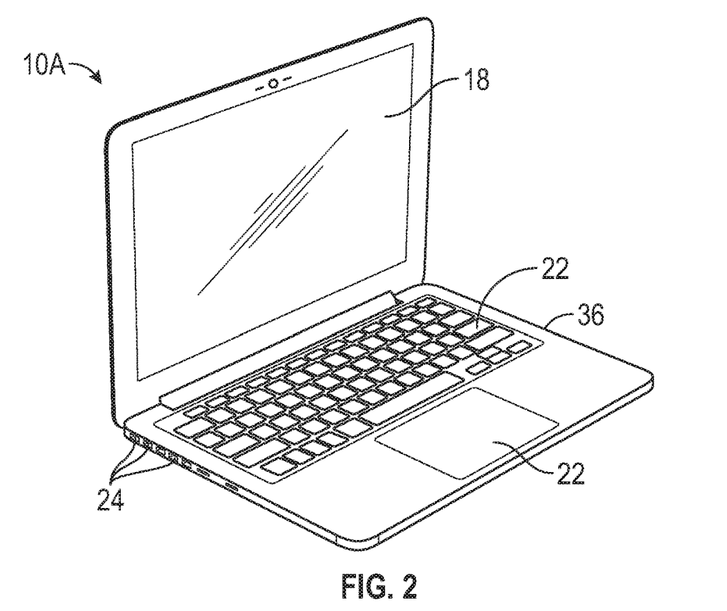
FIG. 2 is a perspective view of a notebook computer representing an embodiment of the electronic device of FIG. 1.
Figure 3:
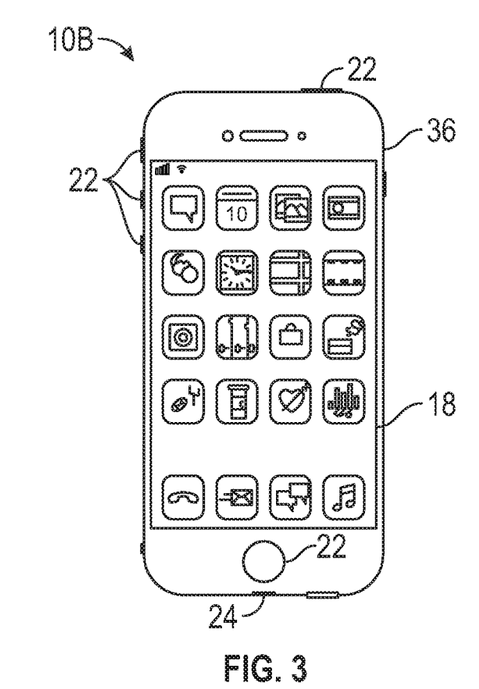
FIG. 3 is a front view of a hand-held device representing another embodiment of the electronic device of FIG. 1.
Figure 4:
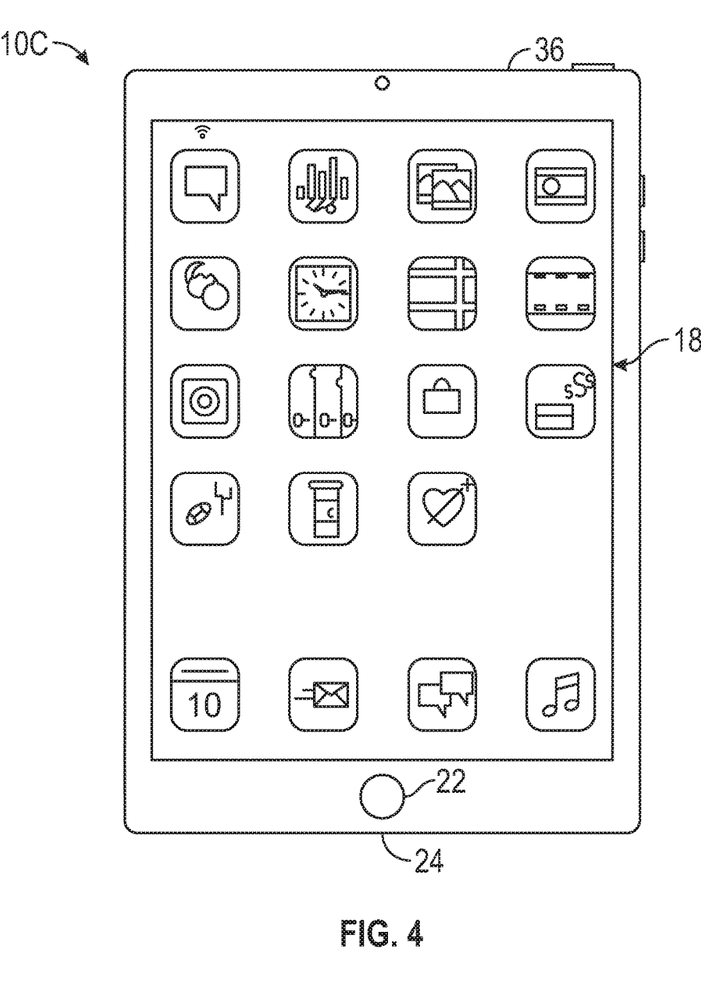
FIG. 4 is a front view of another hand-held device representing another embodiment of the electronic device of FIG. 1.
Figure 5:
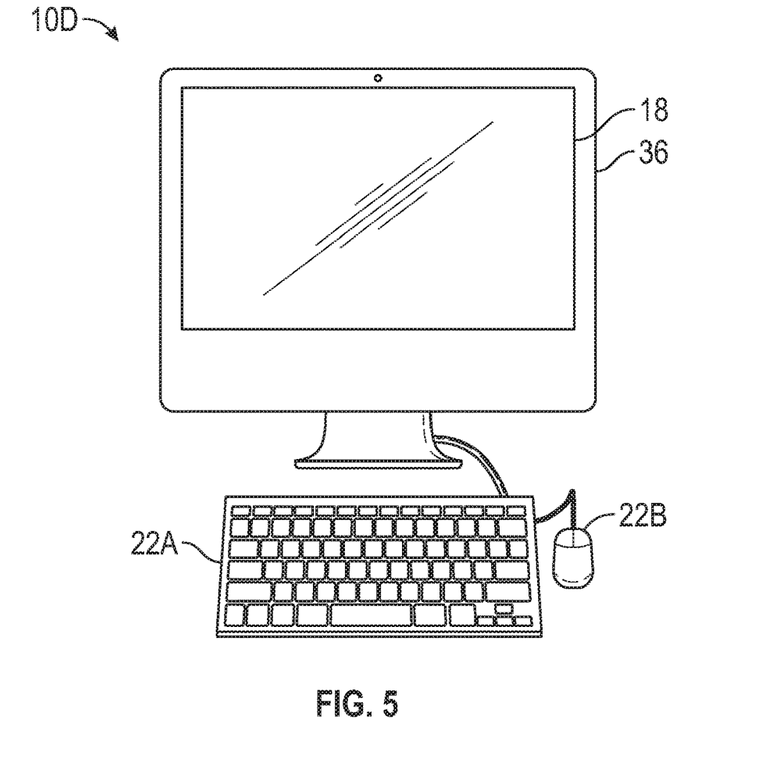
FIG. 5 is a front view of a desktop computer representing another embodiment of the electronic device of FIG. 1.
Figure 6:
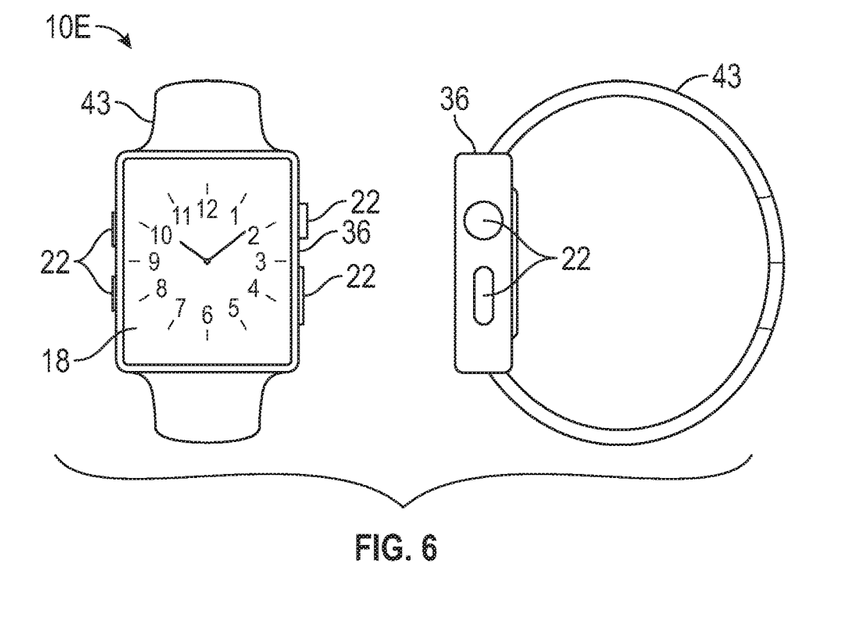
FIG. 6 is a front view and side view of a wearable electronic device representing another embodiment of the electronic device of FIG. 1.

By way of example, the electronic device 10 may represent a block diagram of the notebook computer depicted in FIG. 2, the handheld device depicted in FIG. 3, the handheld device depicted in FIG. 4, the desktop computer depicted in FIG. 5, the wearable electronic device depicted in FIG. 6, or similar devices. It should be noted that the processor(s) 12 and other related items in FIG. 1 may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 may be operably coupled with the memory 14 and the nonvolatile storage 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include, for example, one or more interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, $5^{th}$ generation (5G) cellular network, long term evolution (LTE) cellular network, long term evolution enhanced license assisted access (LTE-eLAA) cellular network, or long term evolution advanced (LTE-A) cellular network. The network interface 26 may also include one or more interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-Wideband (UWB), alternating current (AC) power lines, and so forth.

In certain embodiments, to allow the electronic device 10 to communicate over the aforementioned wireless networks (e.g., Wi-Fi, WiMAX, mobile WiMAX, 4G, 5G, LTE, and so forth), the electronic device 10 may include a transceiver 28. The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, the transceiver 28 may transmit and receive OFDM signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, 5G, and LTE, LTE-eLAA, and LTE-A cellular networks), WiMAX networks, mobile WiMAX networks, ADSL and VDSL networks, DVB-T and DVB-H networks, UWB networks, and so forth. Further, as described below, the transceiver 28 may facilitate bi-directional communication (e.g., full-duplex communication). For instance, in some embodiments the transceiver 28 may be implemented to operate using frequency division duplexing (FDD). That is, for example, the transceiver 28 may synchronously (e.g., concurrently) transmit a transmission signals in a first frequency band and may receive a received signal in a second frequency band different from the first frequency band. Moreover, in some embodiments, the transceiver 28 may additionally or alternatively operate using carrier aggregation techniques, such that multiple signals (e.g., component carriers) may be included in a signal transmitted and/or received via the transceiver 28. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 in accordance with one embodiment of the present disclosure. The depicted computer 10A may include a housing or enclosure 36, a display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPhone® available from Apple Inc. of Cupertino, Calif. The handheld device 10B may include an enclosure 36 to protect interior components from physical damage and to shield them from electromagnetic interference. The enclosure 36 may surround the display 18. The I/O interfaces 24 may open through the enclosure 36 and may include, for example, an I/O port for a hardwired connection for charging and/or content manipulation using a standard connector and protocol, such as the Lightning connector provided by Apple Inc., a universal service bus (USB), or other similar connector and protocol.

Input structures 22, in combination with the display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer, or one of various portable computing devices. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the display 18. In certain embodiments, a user of the computer 10D may interact with the computer 10D using various peripheral input devices, such as the keyboard 22A or mouse 22B (e.g., input structures 22), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

Figure 7:
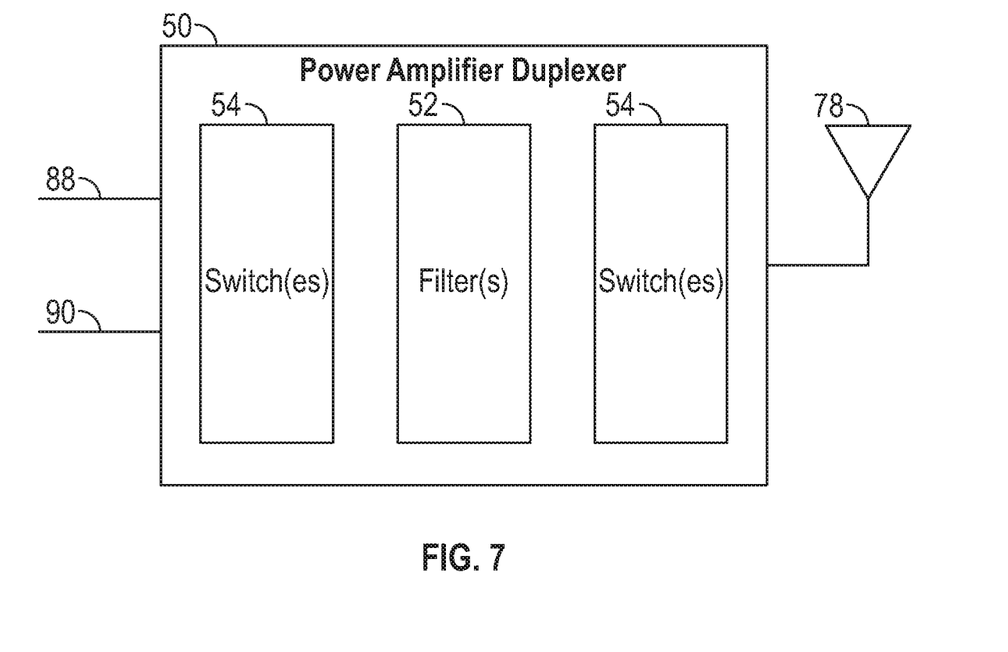
FIG. 7 is a schematic diagram of a power amplifier duplexer, in accordance with an embodiment.

As previously noted above, each embodiment (e.g., notebook computer 10A, handheld device 10B, handheld device 10C, computer 10D, and wearable electronic device 10E) of the electronic device 10 may include a transceiver 28. In some embodiments, to facilitate full-duplex communication, the transceiver 28 may include a duplexer, such as a power amplifier duplexer (PAD) 50. With the foregoing in mind, FIG. 7 depicts a schematic block diagram of a first embodiment of a power amplifier duplexer (PAD) 50 within the transceiver 28. The various functional blocks shown in FIG. 7 may include hardware elements (including circuitry), software elements (including computer code stored on a computer-readable medium) or a combination of both hardware and software elements. It should also be noted that FIG. 7 is merely one example of a particular implementation and is intended to illustrate the types of components that may be present in the PAD 50. As such, functional blocks may be added or omitted, and their arrangement within the PAD 50 may be modified.

In some embodiments, the PAD 50 may be implemented to isolate signals transmitted by the transceiver 28 via a transmitter signal path 88 (e.g., transmission signals) from signals received at the transceiver 28 via a receiver signal path 90 (e.g., received signals) based at least in part on a difference in frequency, timing, and/or a coding scheme between the transmission signals and the received signals. For instance, in some embodiments, the transceiver 28 may be implemented to facilitate bi-directional communication using frequency division duplexing (FDD). That is, for example, the transceiver 28 may synchronously (e.g., concurrently) and/or asynchronously (e.g., consecutively) transmit the transmissions signals in a first frequency band and may receive the received signals in a second frequency band different from the first frequency band. Accordingly, the PAD 50 may include filtering circuitry, such as a number of frequency-selective filters 52 (e.g., surface acoustic wave and/or thin film bulk acoustic resonator filters). In operation, the filters 52 may provide isolation between signals on the transmitter signal path 88 and signals on the receiver signal path 90 based on a frequency difference between the signals on the respective signal paths. For instance, a first filter 52 communicatively coupled to the transmitter signal path 88 may be implemented to attenuate (e.g., reduce and/or remove) received signals (e.g., noise on the transmitter signal path) to isolate the transmission signals, and second filter 52 communicatively coupled to the receiver signal path 90 may be implemented to prevent the transmission signals (e.g., noise on the transmitter signal path) from leaking into and/or overloading the receiver.

Figure 8:
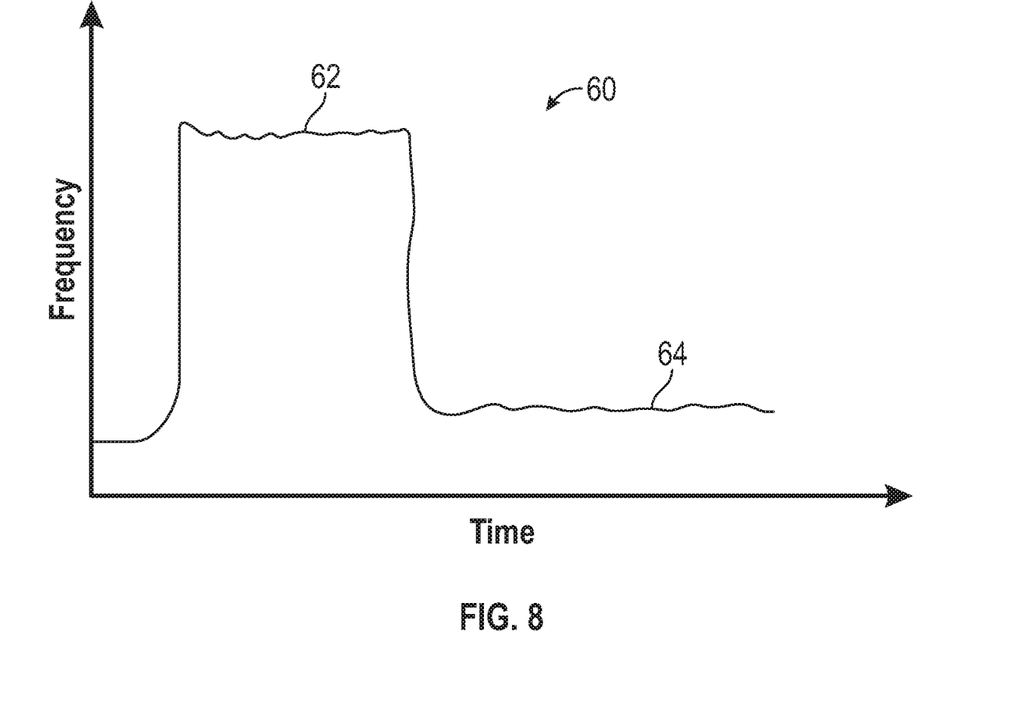
FIG. 8 is a graph plotting an example of a transmission signal, in accordance with an embodiment.

Turning briefly to FIG. 8, an example of an embodiment of a transmission signal 60, which may be transmitted via the transceiver 28, is illustrated. As illustrated, in some embodiments, the transmission signal 60 may include a signal component 62 having a first frequency (e.g., a first frequency range), as well as a noise component 64, which may include a second frequency (e.g., a second frequency range) different from the first frequency. In some embodiments, for example, the noise component 64 may include one or more nonlinear products, such as harmonic frequencies of the first frequency, inter-modulation products, and/or the like.

As discussed herein, in some embodiments, the transceiver 28 may use downlink carrier aggregation to receive an input signal that may include several signals aggregated into one or more frequency bands. In some embodiments, for example, the input signal may include two or more signals (e.g., component carriers), each with a particular bandwidth (e.g., 1.4 megaHertz (MHz), 3 MHz, 5 MHz, 10 MHz, 15 MHz, 20 MHz, and/or the like), aggregated contiguously into a signal with a single frequency band with another bandwidth (e.g., 40 MHz, 60 MHz, 80 MHz, 100 MHz, and/or the like). That is, for example, the transceiver 28 may receive intra-band, contiguous downlink carrier aggregation signals. In other embodiments, the input signal may include a number of component carriers aggregated non-contiguously within the same frequency band and/or across a number of different frequency bands. Accordingly, the transceiver 28 may additionally or alternatively receive intra-band, non-contiguous and/or inter-band, non-contiguous downlink carrier aggregation signals, respectively. Moreover, as described in greater detail below, the transceiver 28 may be implemented to include a number of downlink receiver channels in the receiver signal path 90. Each of the downlink receiver channels may be implemented to receive a respective component carrier of a downlink carrier aggregation signal received at the transceiver 28.

To accommodate multiple component carriers in a signal received via downlink carrier aggregation, the received downlink carrier aggregation signal may occupy a wider frequency range (e.g., bandwidth) than an individual signal (e.g., a non-carrier aggregated signal). As a result, in some embodiments, one or both of the signal component 62 and the noise component 64 of the transmission signal 60 may produce noise and/or interference on one or more of the downlink receiver channels. More specifically, because the respective frequency of the signal component 62 and/or the noise component 64 of the transmission signal 60 may overlap with the frequency of the respective component carrier a downlink receiver channel is implemented to receive, without proper isolation between the transmission signal 60 and the component carrier, the noise component 64 and/or the signal component 62 may de-sense the downlink receiver channel. To that end, detection of the respective component carrier at the downlink receiver channel may be degraded and/or prevented. Accordingly, as described in greater detail below, to facilitate downlink carrier aggregation, the transceiver 28 may be implemented to isolate both the signal component 62 and the noise component 64 of a transmission signal 60 from a received signal (e.g., a component carrier) on the receiver signal path 90.

Returning now to FIG. 7, while the filters 52 may provide a low insertion loss, they may support (e.g., isolate) a single frequency band. To that end, to support multi-band operation and/or to isolate the received signals from both the signal component 62 and the noise component 64 of a transmission signal 60, the transceiver 28 may be implemented to include multiple power amplifier duplexers 50 and/or filters 52. Accordingly, one or more power amplifier duplexers 50 may be connected to an antenna 78 (e.g., an RF antenna) through antenna switches 54. Thus, a series of switches 54 may be used in addition to multiple filters 52 to provide proper isolation of the transmitter and receiver (e.g., the transmitter signal path 88 and the receiver signal path 90, respectively). However, as illustrated in FIG. 7, integrating the switches 54 and filters 52 may result in bulky and/or costly circuitry in terms of power consumption, area consumption, fabrication costs and/or the like.

Figure 9:
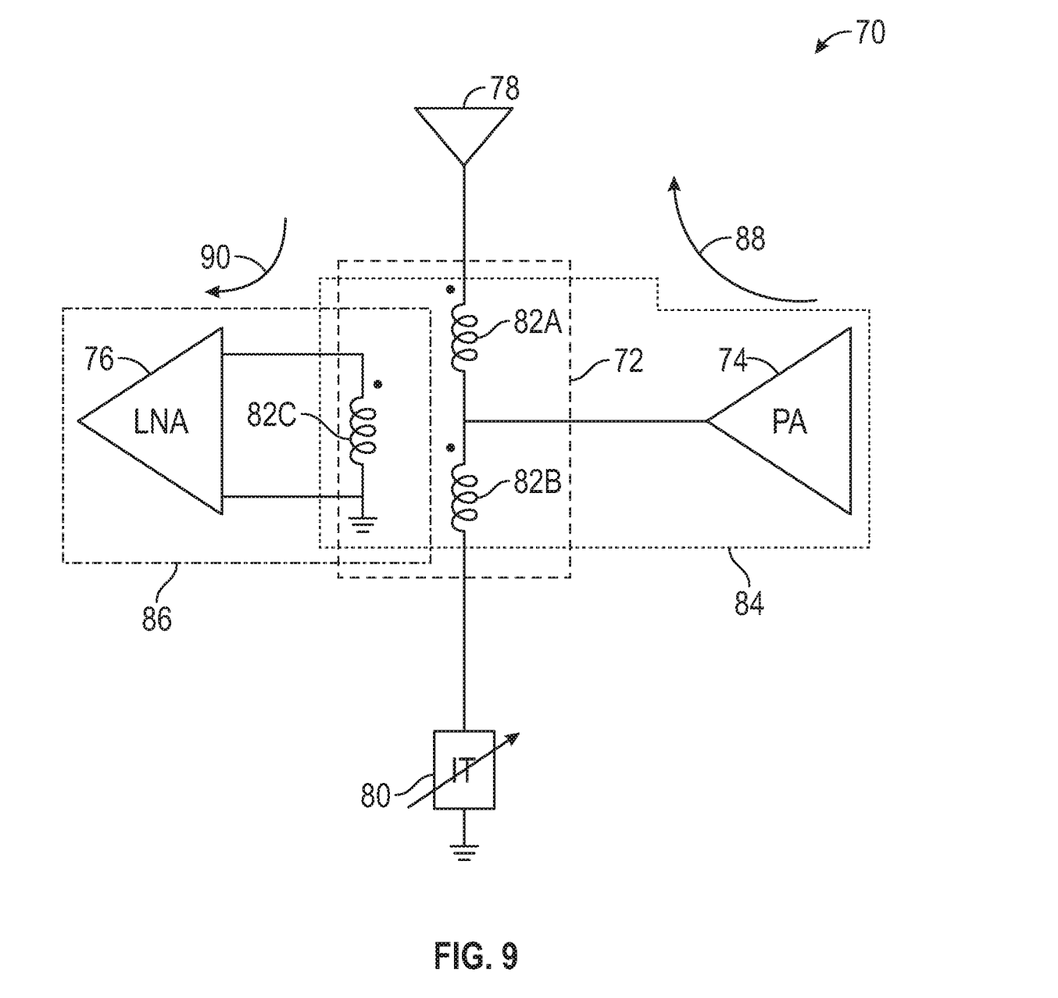
FIG. 9 is schematic block diagram of an electrical balance duplexer, in accordance with an embodiment.

Accordingly, in some embodiments, the transceiver 28 may additionally or alternatively include a duplexer implemented to isolate the transmission signals and the received signals based at least in part on electrical balance (e.g., impedance), as illustrated in FIG. 9. More specifically, FIG. 9 illustrates an electrical balance duplexer 70. Because the electrical balance duplexer 70 isolates signals based in part on an electrical balance, the electrical balance duplexer 70 may operate independently from the differences in frequency, timing, and/or coding schemes associated with transmission signals and/or received signals described above. Thus, as illustrated, the electrical balance duplexer 70 may be implemented with a reduced number of filters and/or switches and/or may be implemented without filters and/or switches. To that end, the area involved in implementing the electrical balance duplexer 70 may be reduced. Moreover, the electrical balance duplexer 70 may operate under fewer frequency constraints. As such, the electrical balance duplexer 70 may support transceiver 28 operation according to multiple communication standards. That is, for example, the electrical balance duplexer 70 may increase the operational flexibility of the transceiver 28 by enabling the transceiver 28 to operate according to additional communication standards and/or to dynamically switch between operation under different communication standards.

As illustrated, in some embodiments, the electrical balance duplexer 70 may be implemented with a hybrid transformer 72, which may be implemented to couple a power amplifier (PA) 74, a low noise amplifier (LNA) 76, an antenna 78, and an impedance tuner 80 (e.g., a balancing impedance) via a hybrid junction (e.g., a four port hybrid junction). For example, a first inductor 82A and a second inductor 82B of the hybrid transformer may be communicatively coupled to the antenna 78 and the power amplifier 74 to form a transmitter port 84 of the hybrid transformer 72. Further, a third inductor 82C of the hybrid transformer 72 may be magnetically coupled to the first inductor 82A and the second inductor 82B, as well as communicatively coupled to the low noise amplifier 76, to form a receiver port 86 of the hybrid transformer 72.

The electrical balance duplexer 70 may be implemented such that the transmitter port 84 is isolated from the receiver port 86 and vice versa at the hybrid transformer 72, which may isolate the transmitter signal path 88 from the receiver signal path 90. For example, to isolate the ports, the electrical balance duplexer 70 may be implemented to provide an electrical balance between the transmitter port 84 and the receiver port 86 by balancing (e.g., matching) the impedance of the impedance tuner 80 with the impedance of the antenna 78 (e.g., antenna impedance). More, specifically, in some embodiments, the electrical balance duplexer 70 may be implemented to isolate the signal component 62 of the transmission signals 60 transmitted via the transmitter signal path 88 from the receiver signal path 90.

Figure 10:
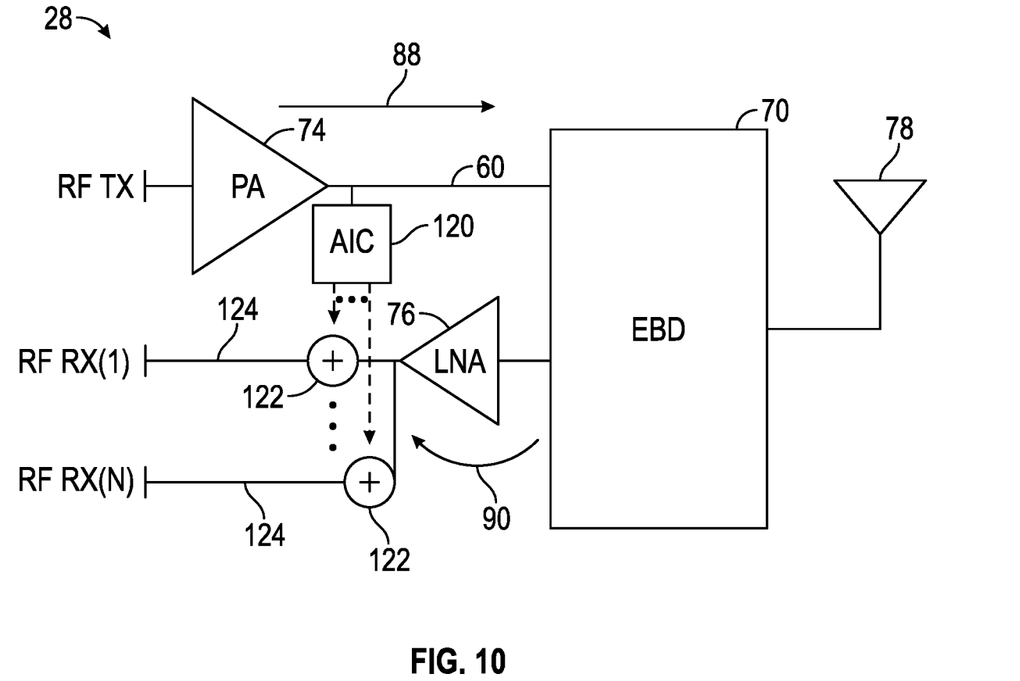
FIG. 10 is a schematic block diagram of a transceiver that includes an electrical balance duplexer and analog interference cancellation circuitry, in accordance with an embodiment.

Thus, as illustrated in FIG. 10, the transceiver 28 may implemented to include analog interference cancellation circuitry 120. In some embodiments, the analog interference cancellation circuitry 120 may be communicatively coupled to an output (e.g., output circuitry) of the power amplifier 74. Further, the analog interference cancellation circuitry 120 may include output circuitry communicatively coupled to a first input of an adder 122 (e.g., adder circuitry). A second input of the adder 122 may be communicatively coupled to an output of the low noise amplifier 76. Moreover, an output of the adder 122 may be communicatively coupled to a downlink receiver channel 124, which may be included in the receiver signal path 90. Accordingly, as described in greater detail below, while the electrical balance duplexer 70 may be implemented to isolate the signal component 62 of the transmission signals 60 transmitted via the transmitter signal path 88 from the receiver signal path 90, the analog interference cancellation circuitry 120 may be implemented to isolate (e.g., reduce and/or remove) the noise component 64 of the transmission signal 60 from the downlink receiver channel 124. More specifically, the analog interference cancellation circuitry 120 may be implemented to isolate the noise component 64 of the transmission signal 60 from each of a number of downlink receiver channels 124, which may respectively correspond to a different component carrier of a downlink carrier aggregation signal received at the transceiver 28.

As described in greater detail below, the analog interference cancellation circuitry 120 may be implemented to receive and/or sample a transmission signal 60 that is transmitted via the transceiver 28. For instance, the analog interference cancellation circuitry 120 may receive the signal output at the power amplifier 74, which is included in the transmitter signal path 88. Moreover, the analog interference cancellation circuitry 120 may be implemented to produce a number of outputs by adjusting a respective delay and/or a respective gain of different copies of the sampled transmission signal 60. In some embodiments, for example, each of the downlink receiver channels 124 respectively correspond to a different component carrier of a downlink carrier aggregation signal received at the transceiver 28, as discussed herein. Accordingly, the frequency of the noise component 64 and/or another portion the transmission signal 60 that produces interference and/or de-senses a downlink receiver channel 124 may vary between the downlink receiver channels 124. As such, the analog interference cancellation circuitry 120 may be implemented to divide the transmission signal 60 into a number of signals and to produce a respective output signal for each of the downlink receiver channels 124 by adjusting the delay and/or gain of one or more of the number of signals. To that end, the analog interference cancellation circuitry 120 may produce a respective output signal corresponding to (e.g., matching) the respective expected (e.g., predicted) noise caused by the transmission signal 60 for each of the downlink receiver channels 124. Moreover, in some embodiments, the adder 122 may subtract the output signal from the received signal and/or add the inverse of the output signal with the received signal on a particular downlink receiver channel 124 to reduce and/or remove the interference caused by the transmission signal 60.

Figure 11:
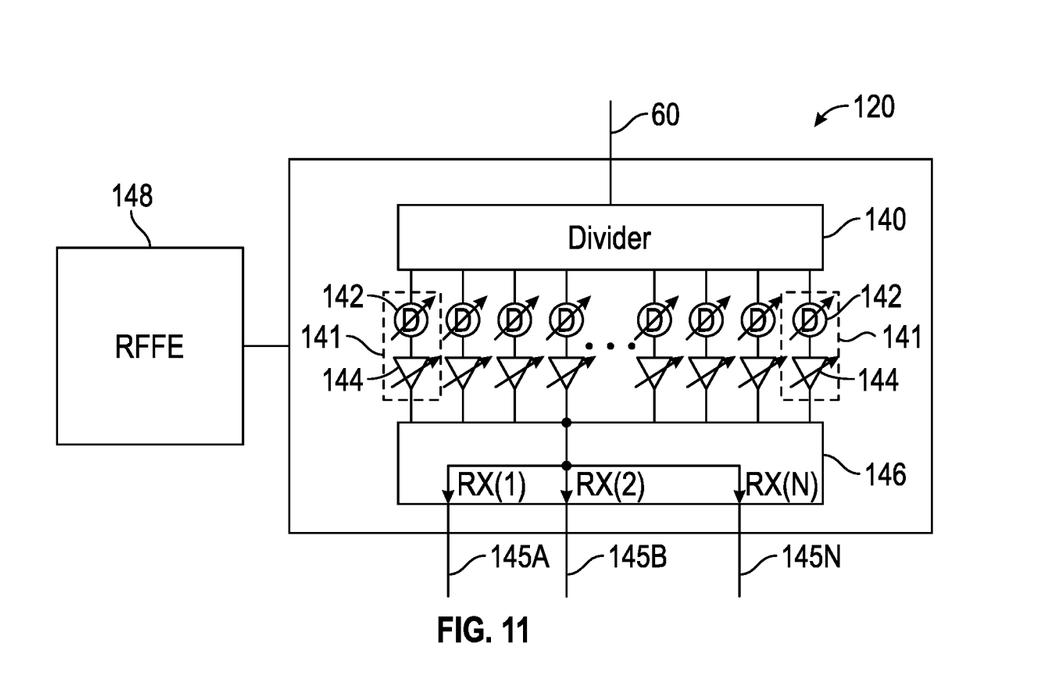
FIG. 11 is a schematic block diagram of a first embodiment of the analog interference cancellation circuitry of FIG. 10, in accordance with an embodiment.

To help illustrate, an embodiment of the analog interference cancellation circuitry 120 is shown in FIG. 11. As illustrated, in some embodiments, the analog interference cancellation circuitry 120 may include divider circuitry 140, which may include a number of buffers. The analog interference cancellation circuitry 120 may also include a number of analog interference cancellation (AIC) units 141, which may each include a variable delay line 142 (e.g., delay circuitry) and a variable gain element 144, such as a variable amplifier. Further, the analog interference cancellation circuitry 120 may include a variable multiplexer 146. In some embodiments, the variable multiplexer 146 may be implemented to select a variable number of inputs to be routed to a particular output, and the variable multiplexer 146 may also be implemented to select a particular input or set of inputs to be routed to one or more outputs.

In operation, the analog interference cancellation circuitry 120 may receive (e.g., sample) the transmission signal 60 at the output of the power amplifier 74. Further, the analog interference cancellation circuitry 120 may route the transmission signal 60 to the divider circuitry 140, which may be implemented to distribute the transmission signal 60 to each of the AIC units 141. An AIC unit 141 may then apply a respective delay and/or a respective gain via the variable delay line 142 and/or the variable gain element 144, respectively, to the transmission signal 60 distributed to the AIC unit 141. In some embodiments, the analog interference cancellation circuitry 120 and/or the AIC units 141 may be communicatively coupled to a controller, such as a radio-frequency front-end interface (RFFE) 148. To that end, in some embodiments, the RFFE 148 may control the delay and/or the gain applied by each AIC unit 141. More specifically, as described in greater detail below, the RFFE 148 may tune the delay and/or the gain applied by each AIC unit 141 such that the effect of the noise component 64 on the downlink receiver channels 124 is reduced or removed.

Each of the AIC units 141 may be implemented to route a respective output to the variable multiplexer 146. In some embodiments, the variable multiplexer 146 and/or the analog interference cancellation circuitry 120 may include an output corresponding to each downlink receiver channel 124 included in the transceiver 28. Thus, because the transceiver 28 may include a downlink receiver channel 124 for each component carrier included in a downlink carrier aggregation signal, the analog interference cancellation circuitry 120 may include a number of outputs greater than or equal to the number of component carriers included in the downlink carrier aggregation signal. Moreover, the variable multiplexer 146 may be implemented to select one or more input signals as an output based on a select signal. In some embodiments, for example, the variable multiplexer 146 may receive the select signal from the RFFE 148, and in such embodiments, the RFFE 148 may be implemented to generate the select signal to cause the variable multiplexer 146 to select a particular set of input signals as an output signal.

By adjusting the delay and/or gain of the sampled transmission signal 60 across the set of AIC units 141 and by selectively multiplexing the outputs of the AIC units 141 transmitted as output 145 (e.g., output 145a, output 145b, output 145N) to each of the downlink receiver channels 124 (e.g., RX(1), RX(2), RX(N)), the analog interference cancellation circuitry 120 may reduce and/or remove the effect of the noise component 64 on the downlink receiver channels 124. More specifically, in some embodiments, the RFFE 148 and/or the analog interference cancellation circuitry 120 may characterize the noise component 64. For instance, the RFFE 148 and/or the analog interference cancellation circuitry 120 may characterize the frequency, amplitude, phase, and/or the like of the noise component 64 and/or the transmission signal 60. Moreover, because of differences in delay and/or targeted component carriers between downlink receiver channels 124, the noise component 64 may be different and/or may cause different interference on each downlink receiver channel 124 in the transceiver 28. Accordingly, the analog interference cancellation circuitry 120 may modify (e.g., adjust the gain and/or the delay) the transmission signal 60 distributed to each AIC unit 141 in a respective manner.

In some embodiments, the RFFE 148 and/or the analog interference cancellation circuitry 120 may be initialized and/or calibrated to characterize the noise component 64 and/or to adjust the delay and/or gain of the transmission signal 60 distributed to each AIC unit 141. For instance, the transceiver 28 and/or the electronic device 10 may be include a look up tale (LUT) and/or a mapping of a set of transmission signal characteristics (e.g., phase and/or amplitude) to a corresponding set of gain and/or delay adjustments. In such embodiments, the RFFE 148 and/or the analog interference cancellation circuitry 120 may control the AIC units 141 based at least in part on the LUT and/or the mapping. While a LUT and/or mapping is described herein as associating transmission signal characteristics with particular adjustments, any suitable method of characterizing the transmission signal and/or controlling the AIC units 141 may be used. Thus, embodiments described herein are intended to be illustrative and not limiting.

Moreover, the analog interference cancellation circuitry 120 may select a respective subset of outputs from the AIC units 141 at the variable multiplexer 146 such that each of the outputs of the analog interference cancellation circuitry 120 correspond to the respective noise component 64 predicted and/or estimated to be present in the downlink receiver channel 124. That is, for example, an output of the analog interference cancellation circuitry 120 may match the noise component 64 received at a downlink receiver channel 124 from the low noise amplifier 76. Thus, returning briefly to FIG. 11, in some embodiments, the adder 122 is implemented to subtract the output of the analog interference cancellation circuitry 120 from the downlink receiver channel 124 so that the noise component 64 on the downlink receiver channel 124 may be reduced or eliminated. Additionally or alternatively, the analog interference cancellation circuitry 120 may be implemented to output the inverse of the noise component 64 estimated to be present on the downlink receiver channel 124. In such embodiments, the adder 122 may add the output of the analog interference cancellation circuitry 120 with the signal on the downlink receiver channel 124 to remove or reduce the noise component 64 on the downlink receiver channel 124.

Figure 12:
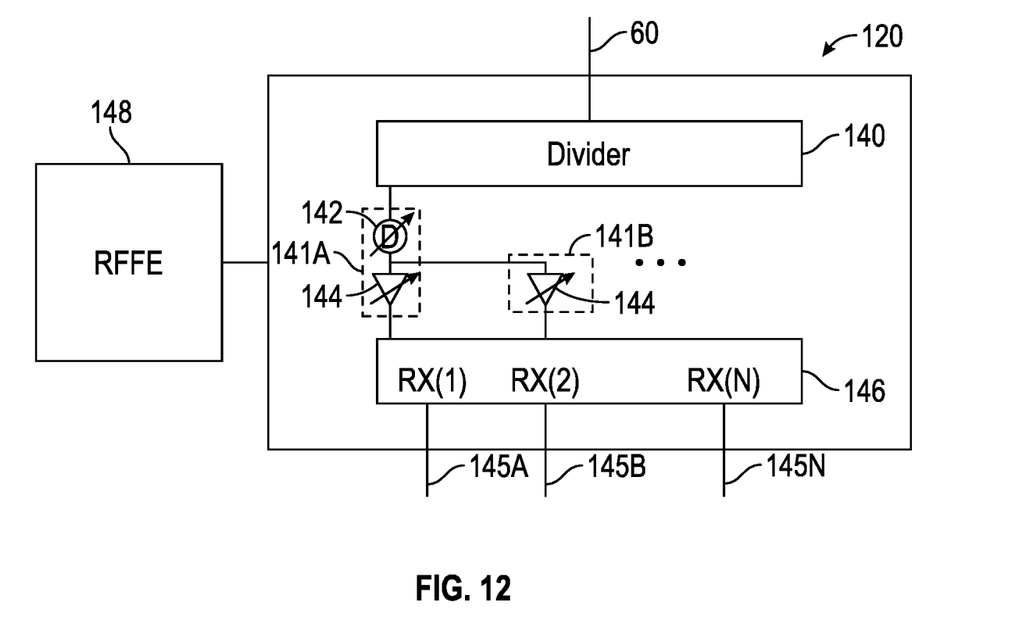
FIG. 12 is a schematic block diagram of a second embodiment of the analog interference cancellation circuitry of FIG. 10, in accordance with an embodiment.

Turning now to FIG. 12, in some embodiments, the analog interference cancellation circuitry 120 may be implemented to reuse and/or share a variable delay line 142 across multiple AIC units 141. For example, as illustrated, a first variable delay line 142 may be used by a first AIC unit 141A and a second AIC unit 141B, while the first AIC unit 141A and the second AIC unit 141B may each include a respective variable gain element 144. Further, by sharing a variable delay line 142 across two or more AIC units 141, the analog interference cancellation circuitry 120 may be implemented with fewer variable delay lines 142 than embodiments having a different variable delay line 142 for each AIC unit 141. As a result, the analog interference cancellation circuitry 120 may be implemented with reduced circuitry and/or complexity. Thus, the fabrication costs, resources (e.g., area, circuitry, power consumption, and/or the like), and/or the like involved with implementing the analog interference cancellation circuitry 120 may be reduced.

Figure 13:
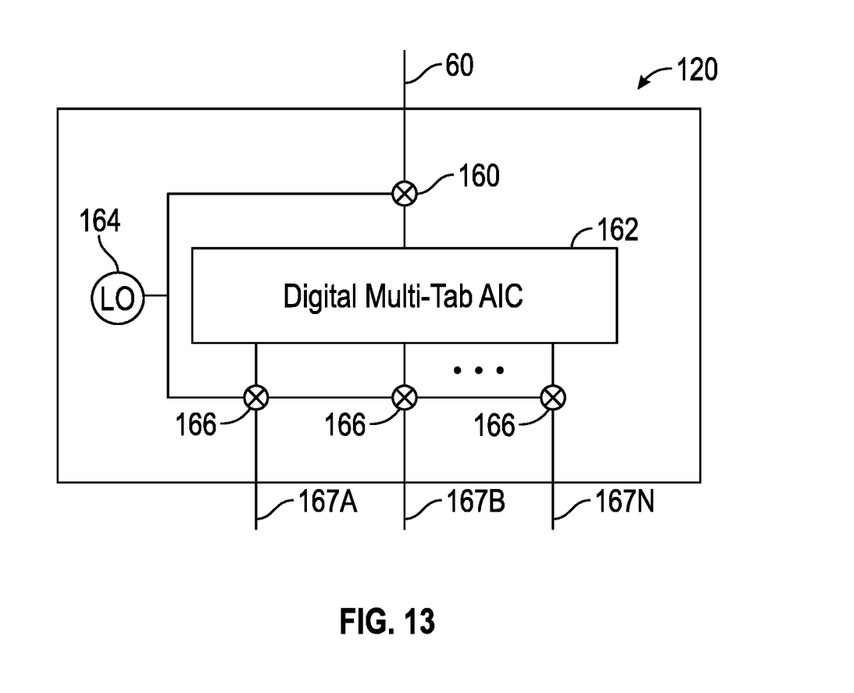
FIG. 13 is a schematic block diagram of a third embodiment of the analog interference cancellation circuitry of FIG. 10, in accordance with an embodiment.

As illustrated in FIG. 13, in some embodiments, one or more components (e.g., circuit components) included in the analog interference cancellation circuitry 120 may additionally or alternatively be assisted and/or replaced by digital logic. For example, the analog interference cancellation circuitry 120 may include a coupler 160 implemented to sample the transmission signal 60 at an output of the power amplifier 74. The coupler 160 may be communicatively coupled to digital multi-tab AIC circuitry and/or logic 162 and a local oscillator (LO) 164. In some embodiments, the digital multi-tab AIC circuitry and/or logic 162 may be implemented to downconvert the transmission signal 60, convert the transmission signal 60 to a digital signal, and characterize the digital transmission signal based on the amplitude, phase, and/or the like of the digital transmission signal. Moreover, in some embodiments, the digital multi-tab AIC circuitry and/or logic 162 may adjust the digital transmission signal by, for example, adjusting the delay and/or gain of the digital transmission signal based on the characterization of the digital transmission signal. The outputs of the digital multi-tab AIC circuitry and/or logic 162 may converted from digital to analog signals and may be upconverted by one or more mixers 166 included in the analog interference cancellation circuitry 120 and communicatively coupled to the local oscillator 164. 141. Outputs 167 (e.g., 167A, output 167B, output 167N) are transmitted to each of the downlink receiver channels 124 (e.g., RX(1), RX(2), RX(N)). Accordingly, in some embodiments, the analog interference cancellation circuitry 120 may be implemented with reduced hardware, which may reduce the cost, area, power consumption, and/or the like involved with implementing the analog interference cancellation circuitry 120.

Figure 14:
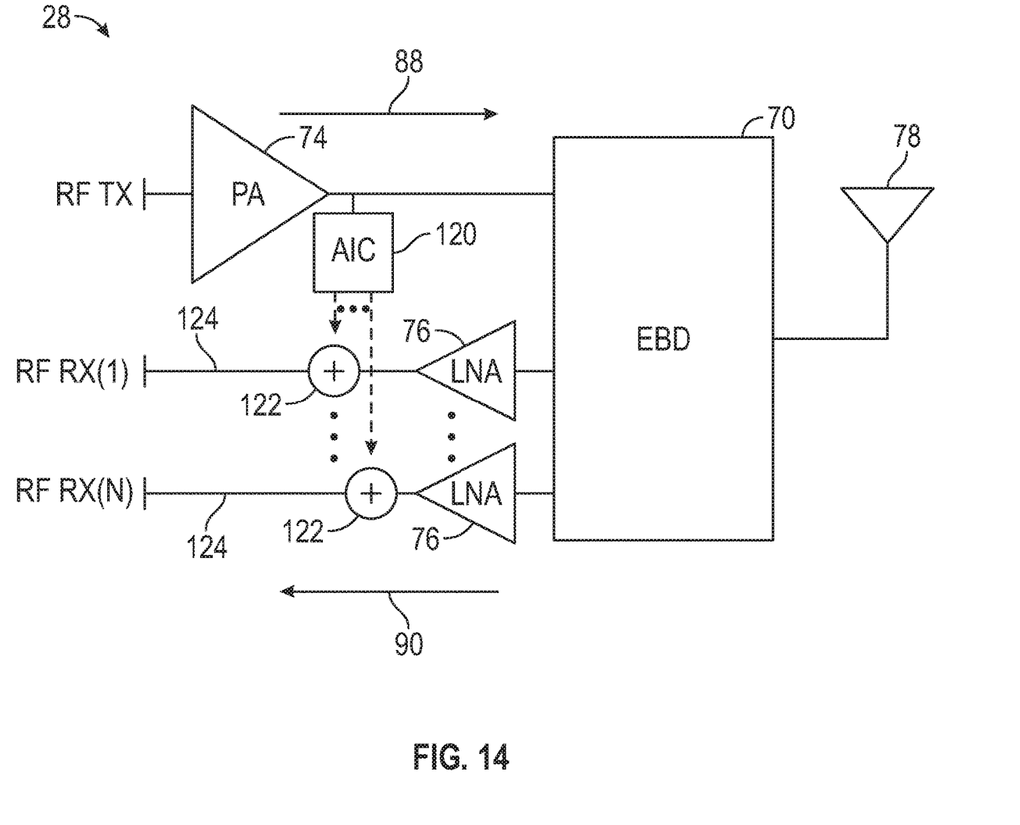
FIG. 14 is a schematic block diagram of a transceiver that includes an electrical balance duplexer, analog interference cancellation circuitry, and multiple low noise amplifiers, in accordance with an embodiment.

Additionally, in some embodiments, a single low noise amplifier 76, as illustrated in FIG. 10, is suitable to receive and process (e.g., amplify) a carrier aggregated signal received at the transceiver 28 via the antenna 78. For example, the single low noise amplifier 76 may operate across the entire bandwidth of an intra-band, contiguous and/or an intra-band non-contiguous carrier aggregation signal. In other embodiments, however, as illustrated in FIG. 14, the transceiver 28 may be implemented with additional low noise amplifiers 76. For example, in some embodiments, the transceiver 28 may include a different low noise amplifier 76 for each downlink receiver channel 124 included in the receiver signal path 90. Moreover, in some embodiments, by implementing the transceiver 28 with multiple low noise amplifiers 76, the transceiver 28 may receive inter-band, non-contiguous carrier aggregation signals.

The specific embodiments described above have been shown by way of example, and it should be understood that these embodiments may be susceptible to various modifications and alternative forms. For instance, in some embodiments, the electrical balance duplexer 70 may be implemented to isolate the noise component 64 from the receiver signal path 90, while the analog interference cancellation circuitry 120 may be implemented to isolate the signal component 62 from the receiver signal path 90. Further, a combination of the embodiments of the analog interference cancellation circuitry 120 illustrated in FIGS. 11-13 may be employed. Moreover, it may be appreciated that the various functional blocks shown in FIGS. 9-14 may include hardware elements (including circuitry), software elements (including computer code stored on a computer-readable medium) or a combination of both hardware and software elements. Additionally, certain functional blocks shown in FIGS. 9-14 may be omitted and/or additional functional blocks may be added. For example, the digital multi-tab AIC circuitry and/or logic 162 illustrated in FIG. 13 may additionally or alternatively include an analog-to-digital converter (ADC), a digital-to-analog converter (DAC), or both. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A transceiver, comprising:
   an electrical balance duplexer configured to reduce first noise in a receiver signal path of the transceiver based at least in part on an electrical balance between the receiver signal path and a transmitter signal path of the transceiver;
   analog interference cancellation circuitry configured to reduce second noise in the receiver signal path, wherein the analog interference cancellation circuitry is configured to reduce the second noise at least in part by:
      sampling a transmission signal configured to be transmitted via the transceiver;
      adjusting one or both of a gain and a delay of the transmission signal to produce an adjusted transmission signal; and
      outputting the adjusted transmission signal to the receiver signal path;
   a first amplifier coupled to a first output from the electrical balance duplexer, wherein the first amplifier is configured to amplify a received signal from the electrical balance duplexer to generate an amplified received signal; and
   adder circuitry configured to add the adjusted transmission signal to the amplified received signal to reduce the second noise from the amplified received signal.

2. The transceiver of claim 1, wherein the first noise corresponds to a signal component of the transmission signal, wherein the signal component comprises a first frequency range.

3. The transceiver of claim 2, wherein the second noise corresponds to a noise component of the transmission signal, wherein the noise component comprises a second frequency range different from the first frequency range.

4. The transceiver of claim 1, wherein the transceiver is configured to receive a downlink carrier aggregation signal comprising one or more component carriers at the receiver signal path.

5. The transceiver of claim 4, wherein the receiver signal path comprises a plurality of downlink receiver channels, wherein a first downlink receiver channel of the plurality of downlink receiver channels is configured to receive a first component carrier of the one or more component carriers, and wherein a second downlink receiver channel of the plurality of downlink receiver channels is configured to receive a second component carrier of the one or more component carriers different from the first component carrier.

6. The transceiver of claim 1, wherein the receiver signal path comprises a first downlink receiver channel and a second downlink receiver channel, wherein, to reduce the second noise in the first downlink receiver channel and the second downlink receiver channel, the analog interference cancellation circuitry is configured to output the adjusted transmission signal to the first downlink receiver channel and to output an additional adjusted transmission signal to the second downlink receiver channel.

7. The transceiver of claim 1, wherein the transceiver comprises a power amplifier, wherein output circuitry of the power amplifier is communicatively coupled to the analog interference cancellation circuitry, and wherein the analog interference cancellation circuitry is configured to sample the transmission signal at the output circuitry.

8. The transceiver of claim 1, wherein the receiver signal path comprises a plurality of low noise amplifiers.

9. The transceiver of claim 1, wherein the analog interference cancellation circuitry is communicatively coupled to a radio-frequency front-end interface (RFFE), wherein the RFFE is configured to:
characterize one or both of an amplitude and a phase of the transmission signal; and
instruct the analog interference cancellation circuitry to adjust one or both of the gain and the delay of the transmission signal to produce the adjusted transmission signal based at least in part on the amplitude, the phase, or a combination thereof.

10. The transceiver of claim 9, comprising a look up table, wherein the look up table comprises a mapping between both the amplitude and the phase of the transmission signal and corresponding levels to adjust one or both of the gain and the delay of the transmission signal to produce the adjusted transmission signal.

11. A transceiver configured to transmit a first signal via an antenna communicatively coupled to a transmitter signal path and receive a second signal at a receiver signal path via the antenna, comprising:
an electrical balance duplexer configured to isolate the receiver signal path from the transmitter signal path based at least in part on an electrical balance between the receiver signal path and the transmitter signal path;
analog interference cancellation circuitry configured to sample the first signal at the transmitter signal path and to output a third signal at first output circuitry of the analog interference cancellation circuitry and a fourth signal at second output circuitry of the analog interference cancellation circuitry based at least in part on the first signal;
first adder circuitry communicatively coupled to the first output circuitry and a first downlink receiver channel of the receiver signal path, wherein the first downlink receiver channel is configured to receive a first portion of the second signal, and wherein the first adder circuitry is configured to adjust the first portion of the second signal based at least in part on the third signal; and
second adder circuitry communicatively coupled to the second output circuitry and to second downlink receiver channel of the receiver signal path, wherein the first downlink receiver channel is configured to receive a second portion of the second signal, and wherein the second adder circuitry is configured to adjust the second portion of the second signal based at least in part on the fourth signal.

12. The transceiver of claim 11, wherein the analog interference cancellation circuitry comprises a plurality of analog interference cancellation units, wherein a first analog interference cancellation unit of the plurality of analog interference cancellation units comprises a first variable delay line and a first variable amplifier, and wherein the first analog interference cancellation unit is configured to selectively adjust, using the first variable delay line, a gain of the first signal and selectively adjust, using the first variable amplifier, a delay of the first signal to output the third signal.

13. The transceiver of claim 12, wherein a second analog interference cancellation unit of the plurality of analog interference cancellation units comprises the first variable delay line and a second variable amplifier.

14. The transceiver of claim 11, wherein the analog interference cancellation circuitry comprises divider circuitry configured to distribute the first signal to each of a plurality of analog interference cancellation units.

15. The transceiver of claim 11, wherein the analog interference cancellation circuitry comprises a variable multiplexer, wherein the variable multiplexer is configured to select one or more outputs corresponding to a respective one or more analog interference cancellation units to output the third signal at the first output circuitry.

16. The transceiver of claim 11, wherein the analog interference cancellation circuitry comprises a coupler configured to sample the first signal.

17. The transceiver of claim 11, wherein the analog interference cancellation circuitry comprises digital multi-tab analog interference cancellation circuitry, wherein the digital multi-tab analog interference cancellation circuitry is configured to:
convert the first signal from a first analog signal to a digital signal to produce a first digital signal;
determine a phase of the first digital signal;
determine an amplitude of the first digital signal;
adjust one or both of a delay and a gain of the first digital signal based at least in part on the phase, the amplitude, or a combination thereof, to produce an adjusted first digital signal; and
convert the adjusted first digital signal to a second analog signal, wherein the analog interference cancellation circuitry is configured to output the third signal based at least in part on the second analog signal.

18. A method of operating a transceiver, comprising:
transmitting, via a transmitter signal path of the transceiver, a first signal at an antenna communicatively coupled to the transmitter signal path;
receiving, via a receiver signal path of the transceiver, a second signal at the antenna, wherein the antenna is communicatively coupled to the receiver signal path, and wherein the second signal comprises a downlink carrier aggregation signal comprising a plurality of component carriers;

reducing, using an electrical balance duplexer of the transceiver, a first noise corresponding to the first signal in the receiver signal path; and reducing, using analog interference cancellation circuitry coupled downstream from an amplifier coupled to an output from the electrical balance duplexer, a second noise corresponding to the first signal in the receiver signal path, wherein reducing the second noise comprises:

reducing, at a first downlink receiver channel of the receiver signal path, a first component of the second noise, wherein the first downlink receiver channel is configured to receive a first component carrier of the plurality of component carriers; and reducing, at a second downlink receiver channel of the receiver signal path, a second component of the second noise, wherein the second downlink receiver channel is configured to receive a second component carrier of the plurality of component carriers different from the first component carrier.

19. The method of claim 18, wherein reducing the first component of the second noise comprises:

adjusting, using the analog interference cancellation circuitry, one or both of a delay and a gain of the first signal to produce a third signal; and adjusting, using adder circuitry of the receiver signal path, the first component carrier based at least in part on the third signal.

* * * * *